(12) United States Patent
Tan et al.

(10) Patent No.: US 12,379,023 B2
(45) Date of Patent: Aug. 5, 2025

(54) SPROCKET

(71) Applicant: Sunstar Singapore Pte. LTD.

(72) Inventors: Wey Chin Tan, Singapore (SG); Chee Onn Leong, Singapore (SG)

(73) Assignee: Sunstar Singapore PTE. Ltd., Singapore (SG)

( * ) Notice: Subject to any disclaimer, the term of this patent is extended or adjusted under 35 U.S.C. 154(b) by 0 days.

(21) Appl. No.: 18/678,959

(22) Filed: May 30, 2024

(65) Prior Publication Data

US 2025/0003476 A1 Jan. 2, 2025

(30) Foreign Application Priority Data

Jun. 28, 2023 (SG) .......................... 10202301845X

(51) Int. Cl.
*F16H 55/30* (2006.01)
*F16H 55/08* (2006.01)

(52) U.S. Cl.
CPC .............. *F16H 55/30* (2013.01); *F16H 55/08* (2013.01)

(58) Field of Classification Search
CPC ........ F16H 55/30; F16H 55/08; F16H 55/303; F16H 7/06; B60Y 2200/12
USPC ....................................................... 474/152
See application file for complete search history.

(56) References Cited

U.S. PATENT DOCUMENTS

| | | | | |
|---|---|---|---|---|
| 1,937,304 A * | 11/1933 | Worrall | ............... | B65G 23/00 74/31 |
| 3,880,478 A * | 4/1975 | Baylor | ............... | B62D 55/0885 474/901 |
| 6,007,442 A * | 12/1999 | Schmidt | ............... | B62M 9/10 474/122 |
| 6,203,462 B1 * | 3/2001 | Takamori | ............... | F16H 7/06 474/160 |
| 6,428,436 B1 * | 8/2002 | Woyach | ............... | F16H 55/30 474/160 |
| 6,666,786 B2 * | 12/2003 | Yahata | ............... | B62M 9/105 474/158 |
| 7,258,638 B2 * | 8/2007 | Valle | ............... | B62M 9/105 474/158 |
| 7,491,143 B2 * | 2/2009 | Valle | ............... | B62M 9/105 474/158 |
| 8,057,337 B2 * | 11/2011 | Clarke | ............... | F16H 7/023 474/152 |
| 8,092,329 B2 * | 1/2012 | Wickliffe | ............... | B62M 9/105 474/160 |
| 8,617,015 B2 * | 12/2013 | Wickliffe | ............... | B62M 9/10 474/140 |
| 9,394,986 B2 * | 7/2016 | Pfeiffer | ............... | F16H 55/30 |
| 9,394,987 B2 * | 7/2016 | Pfeiffer | ............... | F16H 55/30 |
| 9,404,565 B2 * | 8/2016 | Pfeiffer | ............... | F16H 55/30 |
| 9,581,229 B2 * | 2/2017 | Pfeiffer | ............... | B62M 9/105 |

(Continued)

FOREIGN PATENT DOCUMENTS

JP 3224267 U 12/2019

*Primary Examiner* — Henry Y Liu
(74) *Attorney, Agent, or Firm* — Renner, Otto, Boisselle & Sklar, LLP

(57) ABSTRACT

A sprocket capable of suppressing mud intrusion is provided. The sprocket 1 according to one embodiment is a sprocket 1, which includes a plurality of teeth and a mud discharge groove 30 that is formed to partially reduce the plate thickness and opens into the region including the tooth root center (Pbc) and the tooth tip center (Ptc) on the trailing side in the rotational direction.

11 Claims, 4 Drawing Sheets

(56) References Cited

U.S. PATENT DOCUMENTS

| | | | |
|---|---|---|---|
| 9,581,230 B2* | 2/2017 | Pfeiffer | F16H 55/30 |
| 9,581,231 B2* | 2/2017 | Pfeiffer | B62M 9/10 |
| 9,625,027 B2* | 4/2017 | Pfeiffer | B62M 9/10 |
| 9,677,658 B2* | 6/2017 | Wickliffe | B62M 9/10 |
| 9,719,590 B2* | 8/2017 | Reiter | F16H 55/30 |
| 9,873,481 B2* | 1/2018 | Braedt | B62M 9/10 |
| 9,885,409 B1* | 2/2018 | Fukunaga | F16H 55/30 |
| 10,030,360 B2* | 7/2018 | Sewell | E02F 5/06 |
| 11,396,937 B2* | 7/2022 | Tavares Miranda | B62M 9/06 |
| 12,129,918 B2* | 10/2024 | Wickliffe | F16H 55/30 |
| 2002/0086753 A1* | 7/2002 | Yahata | B62M 9/105 |
| | | | 474/160 |
| 2010/0184547 A1* | 7/2010 | Clarke | F16H 55/171 |
| | | | 474/206 |
| 2015/0226305 A1* | 8/2015 | Pfeiffer | B62M 9/105 |
| | | | 474/152 |
| 2015/0226306 A1* | 8/2015 | Pfeiffer | B62M 9/105 |
| | | | 474/152 |
| 2015/0226307 A1* | 8/2015 | Pfeiffer | F16H 7/06 |
| | | | 474/152 |
| 2015/0226308 A1* | 8/2015 | Pfeiffer | B62M 9/105 |
| | | | 474/152 |
| 2015/0285362 A1* | 10/2015 | Pfeiffer | F16H 55/30 |
| | | | 474/152 |
| 2015/0285363 A1* | 10/2015 | Pfeiffer | B62M 9/10 |
| | | | 474/152 |
| 2015/0285364 A1* | 10/2015 | Pfeiffer | B62M 9/10 |
| | | | 474/152 |
| 2017/0074383 A1* | 3/2017 | Sewell | E02F 5/14 |
| 2018/0178880 A1* | 6/2018 | Akanishi | B62M 9/10 |
| 2018/0180157 A1* | 6/2018 | Akanishi | B62M 9/12 |
| 2020/0063850 A1* | 2/2020 | Tavares Miranda | F16H 55/30 |
| 2024/0271662 A1* | 8/2024 | Csizmadia | F16C 33/76 |

\* cited by examiner

SPROCKET

TECHNICAL FIELD

The present invention relates to a sprocket.

BACKGROUND ART

Mechanisms using a chain and sprocket to transmit rotational force are widely used in vehicles such as motorcycles. In off-road vehicles, for instance, it is not uncommon for mud (potentially including sand) to adhere to the sprocket. When mud adheres to the sprocket, issues such as chain dislodgement, reduced driving efficiency, and abnormal wear of the sprocket and chain may arise. As described in Utility Model Registration No. 3224267, for example, it has been proposed to form grooves in the principal surface (the surface perpendicular to the rotational axis) of the sprocket, opening at the base of the teeth, to allow for the expulsion of mud along these grooves.

DISCLOSURE OF THE INVENTION

Problems to be Solved by the Invention

However, even with the formation of grooves in the sprocket that open at the base of the teeth, there remains the possibility of the aforementioned issues occurring when mud adheres to the teeth and intrudes between the teeth and the chain. Therefore, the present invention addresses the problem of providing a sprocket capable of suppressing mud intrusion.

Means for Solving the Problems

The sprocket according to one embodiment of the present invention is a sprocket that includes: a plurality of teeth; and a mud discharge groove that is formed to partially reduce a plate thickness and opens into a region including a tooth root center and a tooth tip center on a trailing side in a rotational direction.

In the sprocket described above, a planar shape of each of the teeth may have a pair of tooth root arc portions that has a constant curvature and is adjacent to the tooth root center, a lateral edge on a leading side of the mud discharge groove in the rotational direction may terminate between the tooth root center and a point where a length along the planar shape of the tooth from a leading end of the tooth root arc on a leading side in the rotational direction becomes a quarter of a length of the tooth root arc portion, and a lateral edge on a trailing side of the mud discharge groove in the rotational direction may terminate between the tooth tip center and the leading end of the tooth root arc portion on the trailing side in the rotational direction.

In the sprocket described above, the mud discharge groove may incline with respect to a radial direction to the trailing side in the rotational direction.

In the sprocket described above, an inclination angle of the lateral edge on the trailing side of the mud discharge groove in the rotational direction may be greater than or equal to 5° and less than or equal to 65° inclusive, with respect to the radial direction.

In the sprocket described above, the mud discharge groove may be formed alternately on both surfaces.

In the sprocket described above, a depth of the mud discharge groove may be greater than or equal to a quarter of the plate thickness and less than or equal to a half of the plate thickness.

Effects of the Invention

According to the present invention, a sprocket capable of suppressing mud intrusion can be provided.

PREFERRED MODE FOR CARRYING OUT THE INVENTION

Figure 1:
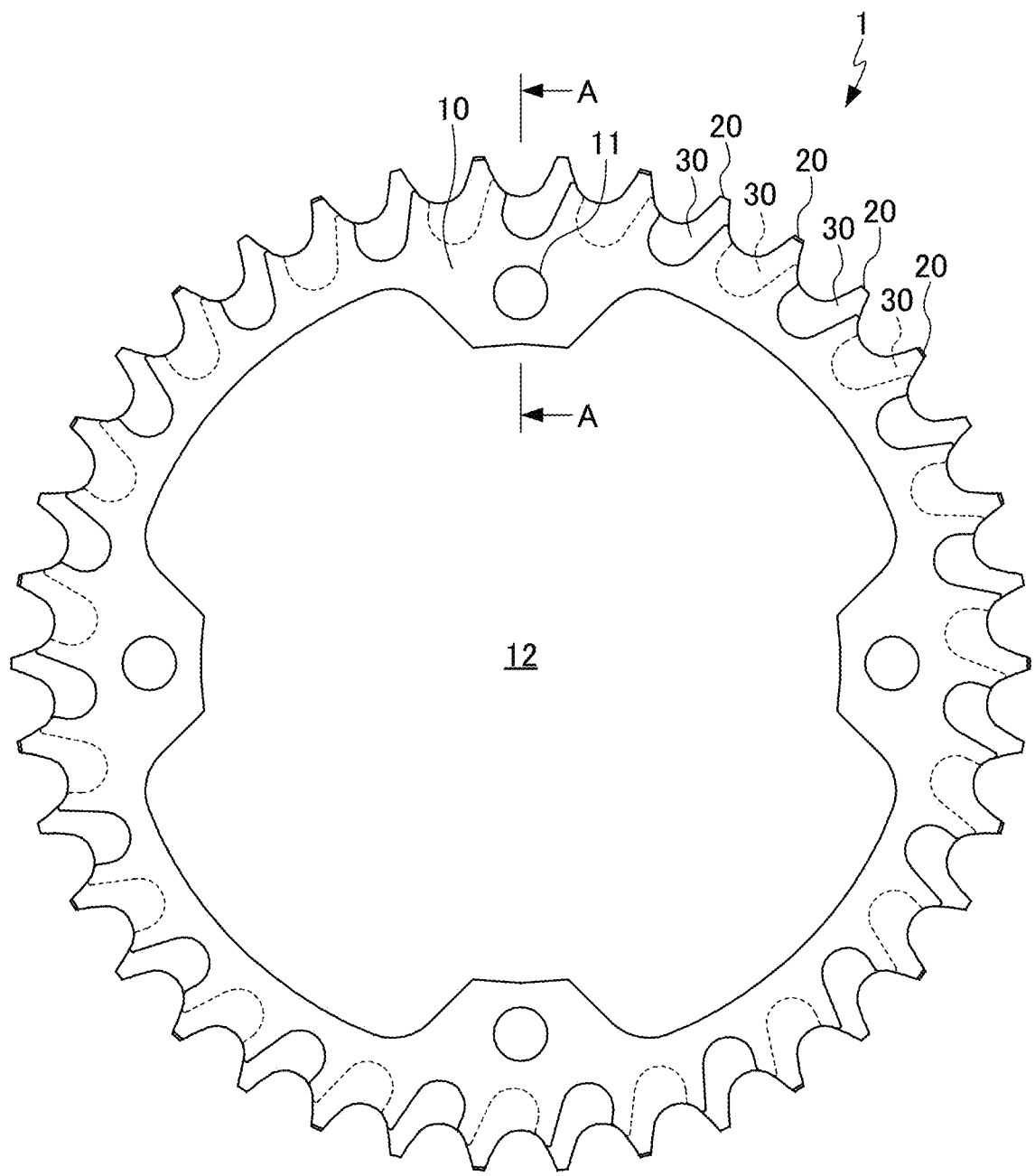
FIG. 1 is a plan view (view from the direction of the rotational axis) of a sprocket according to one embodiment of the present invention.
Figure 2:
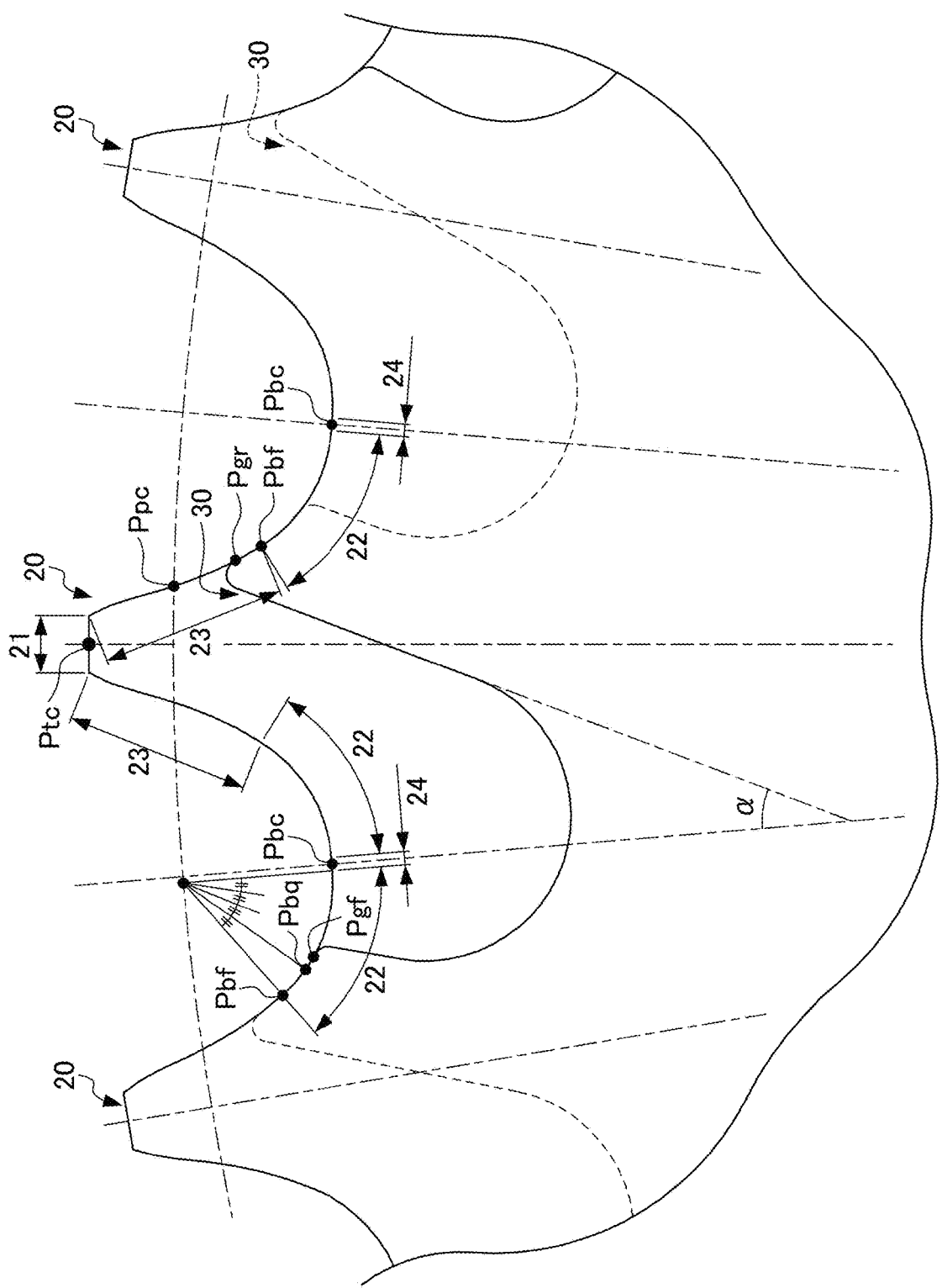
FIG. 2 is a partially enlarged plan view of the sprocket in FIG. 1.
Figure 3:
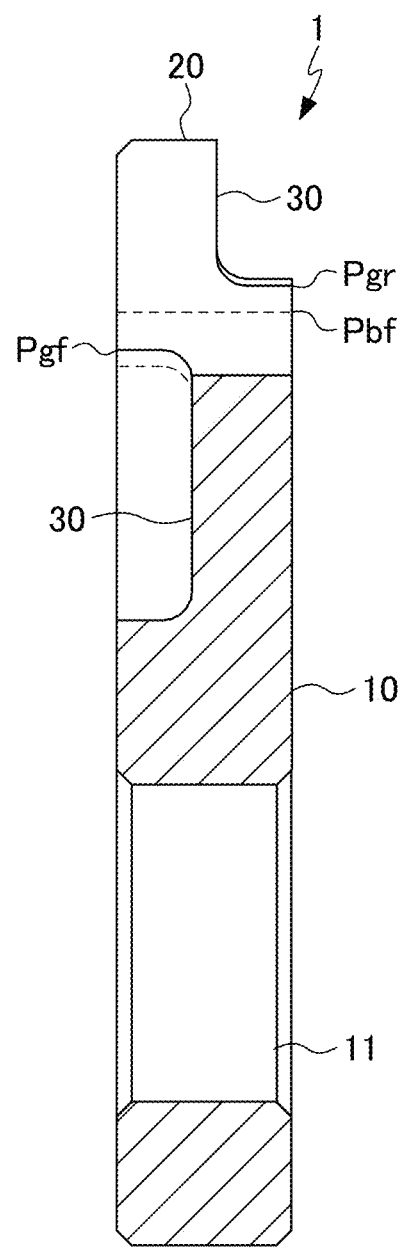
FIG. 3 is a partially enlarged sectional view along the line X-X of the sprocket in FIG. 1.
Figure 4:
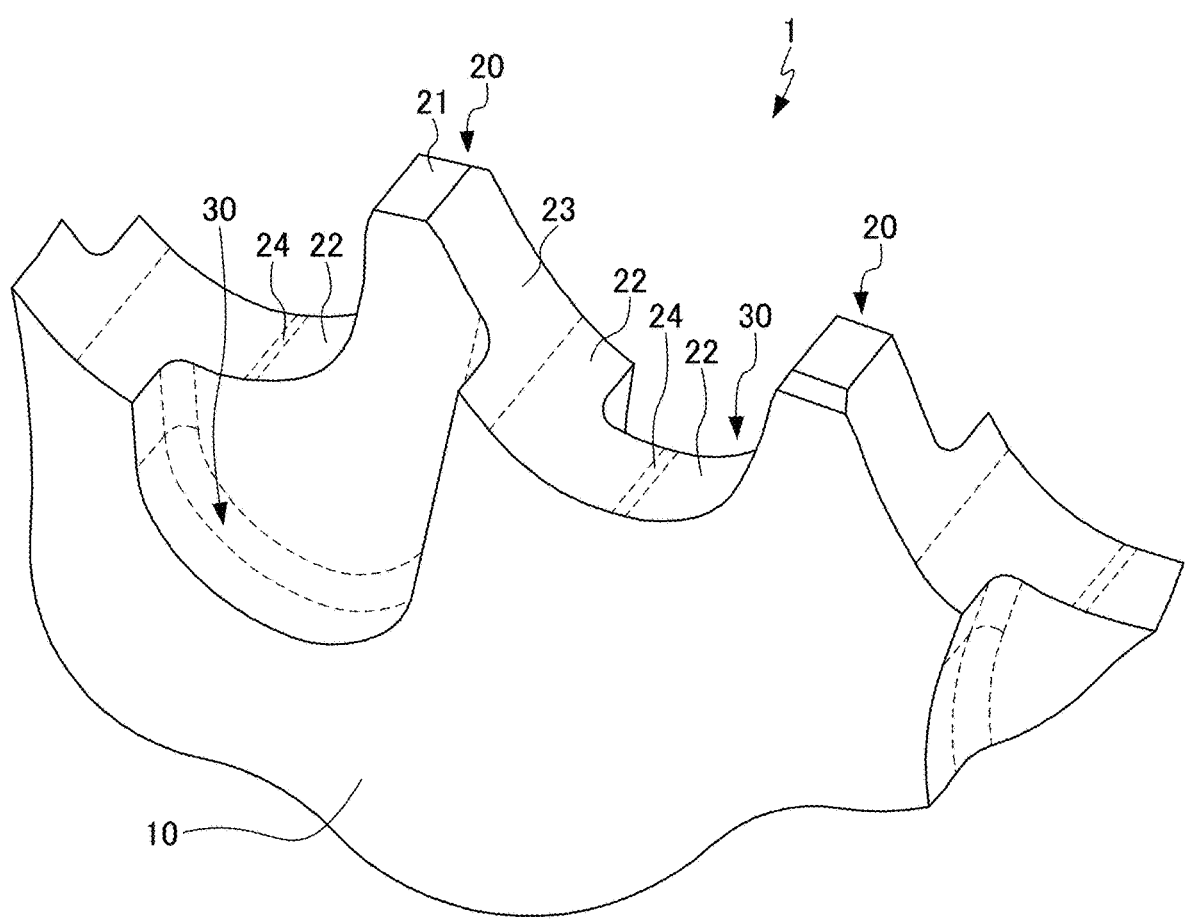
FIG. 4 is a partially enlarged perspective view of the sprocket in FIG. 1.

Hereinafter, an embodiment of the present invention will be described with reference to the drawings. FIG. 1 is a plan view (view from the direction of the rotational axis) of a sprocket 1 according to an embodiment of the present invention. FIG. 2 is a partially enlarged perspective view illustrating the detailed shape of the sprocket 1. FIG. 3 is a partially enlarged sectional view of the sprocket 1. FIG. 4 is a partially enlarged perspective view of the sprocket 1.

A sprocket 1 is a driven sprocket that is driven by a chain (not illustrated) and rotates a rotating shaft (not illustrated) fixed to the sprocket 1. This sprocket 1 rotates counterclockwise. In other words, the outer periphery of the sprocket 1 is driven by the chain, transmitting a counterclockwise torque. The contour of the sprocket 1 in a plan view can conform to the standards such as ANSI, ISO, DIN, JIS, etc.

The sprocket 1 is formed from a plate material with a plate thickness that fits the inner width (the length of the roller or bush) of the inner link of the chain. The material for the sprocket 1 can be exemplified as carbon steel, stainless steel, aluminum and the like. The sprocket 1 may undergo arbitrary surface treatment or painting. The sprocket 1 is preferably used in combination with a single-row chain to suppress mud intrusion between the teeth and chain. Note that the sprocket 1 may integrally include a portion having a larger thickness, such as a hub, on the inside.

The sprocket 1 includes a disk-shaped or annular plate-shaped base 10, a plurality of teeth 20 extending outward from the outer periphery of the base 10, and a plurality of mud discharge grooves 30 formed to partially reduce the plate thickness of the base 10 and the teeth 20.

The base 10 is a portion that supports the plurality of teeth 20 and is typically fixed to the rotating shaft via a hub (not illustrated). The base 10 may have a plurality of mounting holes 11 for fixing to the rotating shaft. The base 10 may have weight saving hole 12 for weight saving.

The teeth 20 may each have a tooth shape (planar shape) as specified by arbitrary standard, for example, the S tooth shape and U tooth shape defined by ANSI, as well as the ISO tooth shape defined by ISO. Specifically, as illustrated in detail in FIG. 2, the planar shape (contour) of each tooth 20 may include: a top portion 21 defined at the center and formed in an arc shape along a tooth tip circle fitting the outer diameter of the sprocket 1; a pair of tooth root arc portions 22 defined at the ends in the circumferential direction and formed in an arc shape with a certain curvature corresponding to the outer diameter of the roller or bush of the chain; and a pair of flank portions 23 defined so as to connect the top portion 21 and the tooth root arc portions 22, forming an angle at the ends of the top portion 21, and smoothly continuing with the tooth root arc portions 22, in which each tooth 20 may be shaped in a convex shape that is line-symmetric with respect to the radial axis of the sprocket 1. The tooth root arc portions 22 of adjacent teeth 20 may be directly connected (for example, S tooth shape and ISO tooth shape), or may be connected via a short linear connection 24 (for example, U tooth shape).

In the sprocket 1, the intersection of the symmetry axis of the tooth 20 and the top portion 21 is a tooth tip center (Ptc) of the tooth 20, and the intersection of the line bisecting the angle of the symmetry axes of adjacent teeth 20 and the tooth root arc portion 22 or connection 24 is a tooth root center (Pbc). Since the connection 24 is extremely short, if present, the tooth root arc portion 22 is interpreted as being defined to be adjacent to the tooth root center (Pbc).

The contour of the tooth 20 in a cross-section including the rotational axis of the sprocket 1 may have a shape, for example, such that the tooth 20 is thinned towards the tip at a constant curvature; however, considering the reduction in thickness by the mud discharge grooves 30, it is preferable not to significantly reduce the thickness, chamfering the corner between the front and back surfaces and the outermost surface of the sprocket 1 may be sufficient in order to ensure the strength of the tooth 20, as illustrated in FIG. 3. This chamfering of the corner between the front and back surfaces and the outermost surface of the sprocket 1 serves as a guide for inserting the tooth 20 between the inner links of the chain. On the other hand, chamfering the corner between the mud discharge groove 30 and the outer circumferential surface of the tooth 20 does not contribute to the engagement of the tooth 20 and the chain; therefore, such chamfering is unnecessary.

The mud discharge grooves 30 are formed to partially reduce the plate thickness of the sprocket 1, and open into the region including the tooth root center (Pbc) and the tooth tip center (Ptc) on the trailing side in the rotational direction (the side that arrives later at a certain angular position by the rotation of the sprocket 1). In other words, the mud discharge grooves 30 are formed to reduce at least the thickness of the leading side portion of the teeth 20 in the rotational direction. In order to efficiently discharge the mud adhering to the sprocket 1, the mud discharge grooves 30 is preferably alternately formed on the front and back surfaces of the sprocket 1, and more preferably alternately formed on the front and back surfaces of all the teeth 20. By alternately forming the mud discharge grooves 30, the surface of the tooth 20 on the opposite side of the mud discharge grooves 30 alternately comes into contact with the inner link of the chain, thus preventing the chain from shifting in the direction of the rotational axis.

The mud discharge groove 30 may typically be formed for a square groove having a square cross-sectional shape, but may also have other cross-sectional shapes of V-groove, round groove, U-groove and the like. Note that the corners inside the mud discharge grooves 30 should preferably be chamfered to alleviate stress concentration. The corner between the lateral edge of the mud discharge groove 30 and the outer peripheral surface of the tooth 20 may also be chamfered. The depth of the mud discharge groove 30 should preferably be greater than or equal to 25% and less than or equal to 50% inclusive, and more preferably greater than or equal to 35% and less than or equal to 45% inclusive, of the plate thickness of the sprocket 1, in order to maintain the strength of the tooth 20 while suppressing mud intrusion.

The mud discharge groove 30 should preferably be formed as a straight groove having a constant width or a taper groove that widens towards the outside of the sprocket 1, in order to efficiently discharge mud by the centrifugal force accompanying the rotation of the sprocket 1. The average width of the mud discharge groove 30 in a plan view should preferably be greater than or equal to the radius and less than or equal to the diameter of the tooth root arc portion 22, in order to ensure sufficient width while being formed separately from adjacent mud discharge grooves 30.

In order to promote the discharge of mud by centrifugal force, the mud discharge groove 30 should preferably incline with respect to the radial direction to the trailing side in the rotational direction. The inclination angle $\alpha$ of the lateral edge on the trailing side of the mud discharge groove 30 in the rotational direction should preferably be greater than or equal to 5° and less than or equal to 65° inclusive, and more preferably greater than or equal to 15° and less than or equal to 45° inclusive, with respect to the radial direction. If the inclination angle $\alpha$ is too small, the effect of promoting mud discharge by using the inclination of the lateral edge of the mud discharge groove 30 as a pressure angle becomes small. On the other hand, if the inclination angle $\alpha$ is too large, the width of the mud discharge groove 30 becomes small, reducing the effect of mud discharge.

A point (Pgf) where the lateral edge on the leading side of the mud discharge groove 30 in the rotational direction ends should preferably be between the tooth root center (Pbc) and the quarter point (Pbq) where the extension from the leading end (Pbf) of the tooth root arc portion 22 of the tooth 20 on the leading side in the rotational direction becomes a quarter of the extension of the tooth root arc portion 22. This allows mud to be efficiently released into the mud discharge groove 30, otherwise mud could be caught between the tooth 20 and the chain as it reaches the tip of the tooth 20 with the rotation of the sprocket 1. The point (Pgr) where the lateral edge on the trailing side of the mud discharge groove 30 in the rotational direction ends should preferably be between the tooth tip center (Ptc) and the leading end (Pbf) of the tooth root arc portion 22 on the trailing end in the rotational direction (the trailing end of the flank portion 23 in the rotational direction), more preferably be on the flank portion 23, and even more preferably be within the radial inner region from the intersection with the pitch circle (Ppc) of the flank portion 23. This enables the mud discharge grooves 30 to be formed over the entire tips of the teeth 20, effectively suppressing the mud intrusion. By satisfying these conditions, the mud discharge groove 30 is not formed in the range from at least the leading end (Pbf) of the tooth root arc portion 22 in the rotational direction, where the roller or bush of the chain is strongly pressed, to the quarter point (Pbq), and has a full plate thickness. This prevents the wear of the tooth 20 from being accelerated by the mud discharge groove 30 due to the friction between the sprocket 1 and the chain. When chamfering the end of the lateral edge of the mud discharge groove 30, the termination point (Pgf) (Pgr) should be interpreted as the intersection with the outer edge of the sprocket 1 of the lateral edge after the chamfering, in order to ensure the contact area with the roller or bush of the chain.

Further, the distance from the tooth root center (Pbc) to the lateral edge of the mud discharge groove 30 on the radial inner side should preferably be greater than or equal to the radius of the tooth root arc portion 22, so that the mud discharge groove 30 is not closed by the chain. The mud discharge groove 30 should preferably be formed with a space from the weight saving hole 12 to ensure strength. The distance between the mud discharge groove 30 and the weight saving hole 12 should preferably be greater than or equal to 0.4 times, and more preferably greater than or equal to 0.8 times the thickness of the sprocket 1.

The sprocket 1 having the above structure has the mud discharge groove 30 formed so as to reduce the thickness of at least part of the tip of the tooth 20, so mud adhering to the sprocket 1 can be efficiently discharged through the mud discharge groove 30. Therefore, mud intrusion between the teeth 20 of the sprocket 1 and the chain can be suppressed, and abnormal load, wear, chain disengagement and the like can be prevented.

Although the sprocket 1 according to one embodiment of the present invention has been described above, the configuration and effects of the sprocket according to the present invention are not limited to those described above.

EXPLANATION OF REFERENCE NUMERALS

1: sprocket
10: base
11: mounting hole
12: weight saving hole
20: tooth
21: top
22: tooth root arc portion
23: flank portion
24: connection
30: mud discharge groove
Ptc: tooth tip center
Pbc: tooth root center
Pbf: leading end in rotational direction
Pbq: quarter point
Pgf: point where leading side ends
Pgr: point where trailing side ends
Ppc: intersection with pitch circle

The invention claimed is:

1. A sprocket comprising:
a plurality of teeth; and
a mud discharge groove that is formed to partially reduce a plate thickness and opens into a region including a tooth root center and a tooth tip center on a trailing side in a rotational direction,
wherein a planar shape of each of the teeth has a pair of tooth root arc portions that has a constant curvature and is adjacent to the tooth root center,
wherein a lateral edge on a leading side of the mud discharge groove in the rotational direction terminates between the tooth root center and a point where a length along the planar shape of the tooth from a leading end of the tooth root arc portion on a leading side in the rotational direction becomes a quarter of a length of the tooth root arc portion, and
wherein a lateral edge on a trailing side of the mud discharge groove in the rotational direction terminates between the tooth tip center and the leading end of the tooth root arc portion on the trailing side in the rotational direction.

2. The sprocket according to claim 1, wherein the mud discharge groove inclines with respect to a radial direction to the trailing side in the rotational direction.

3. The sprocket according to claim 2, wherein an inclination angle of the lateral edge on the trailing side of the mud discharge groove in the rotational direction is greater than or equal to 5° and less than or equal to 65° inclusive, with respect to the radial direction.

4. The sprocket according to claim 1, wherein the mud discharge groove is formed alternately on both a front surface and a back surface of the sprocket.

5. The sprocket according to claim 1, wherein a depth of the mud discharge groove is greater than or equal to a quarter of the plate thickness and less than or equal to a half of the plate thickness.

6. A sprocket comprising:
a plurality of teeth; and
a mud discharge groove that is formed for each tooth of the plurality of teeth to partially reduce a plate thickness and opens into a region including a tooth root center and a tooth tip center on a trailing side in a rotational direction.

7. The sprocket according to claim 6,
wherein a planar shape of each of the teeth has a pair of tooth root arc portions that has a constant curvature and is adjacent to the tooth root center,
wherein a lateral edge on a leading side of the mud discharge groove in the rotational direction terminates between the tooth root center and a point where a length along the planar shape of the tooth from a leading end of the tooth root arc portion on a leading side in the rotational direction becomes a quarter of a length of the tooth root arc portion, and
wherein a lateral edge on a trailing side of the mud discharge groove in the rotational direction terminates between the tooth tip center and the leading end of the tooth root arc portion on the trailing side in the rotational direction.

8. The sprocket according to claim 6, wherein the mud discharge groove inclines with respect to a radial direction to the trailing side in the rotational direction.

9. The sprocket according to claim 8, wherein an inclination angle of the lateral edge on the trailing side of the mud discharge groove in the rotational direction is greater than or equal to 5° and less than or equal to 65° inclusive, with respect to the radial direction.

10. The sprocket according to claim 6, wherein the mud discharge groove is formed alternately on both surfaces of the sprocket.

11. The sprocket according to claim 6, wherein a depth of the mud discharge groove is greater than or equal to a quarter of the plate thickness and less than or equal to a half of the plate thickness.

* * * * *